June 7, 1949. J. MIHALYI 2,472,607
VARIABLE APERTURE CURTAIN SHUTTER FOR CAMERAS
Filed July 30, 1946 5 Sheets-Sheet 1

JOSEPH MIHALYI
INVENTOR

BY
ATTORNEYS

June 7, 1949.  J. MIHALYI  2,472,607
VARIABLE APERTURE CURTAIN SHUTTER FOR CAMERAS
Filed July 30, 1946  5 Sheets-Sheet 2

JOSEPH MIHALYI
INVENTOR

BY
ATTORNEYS

June 7, 1949.  J. MIHALYI  2,472,607
VARIABLE APERTURE CURTAIN SHUTTER FOR CAMERAS
Filed July 30, 1946  5 Sheets-Sheet 3

JOSEPH MIHALYI
INVENTOR
BY
ATTORNEYS

June 7, 1949. J. MIHALYI 2,472,607
VARIABLE APERTURE CURTAIN SHUTTER FOR CAMERAS
Filed July 30, 1946 5 Sheets-Sheet 4
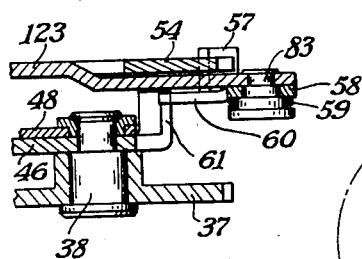
FIG. 11.
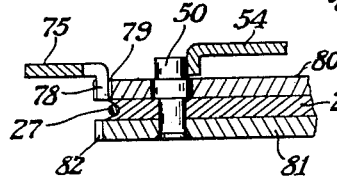
FIG. 13.
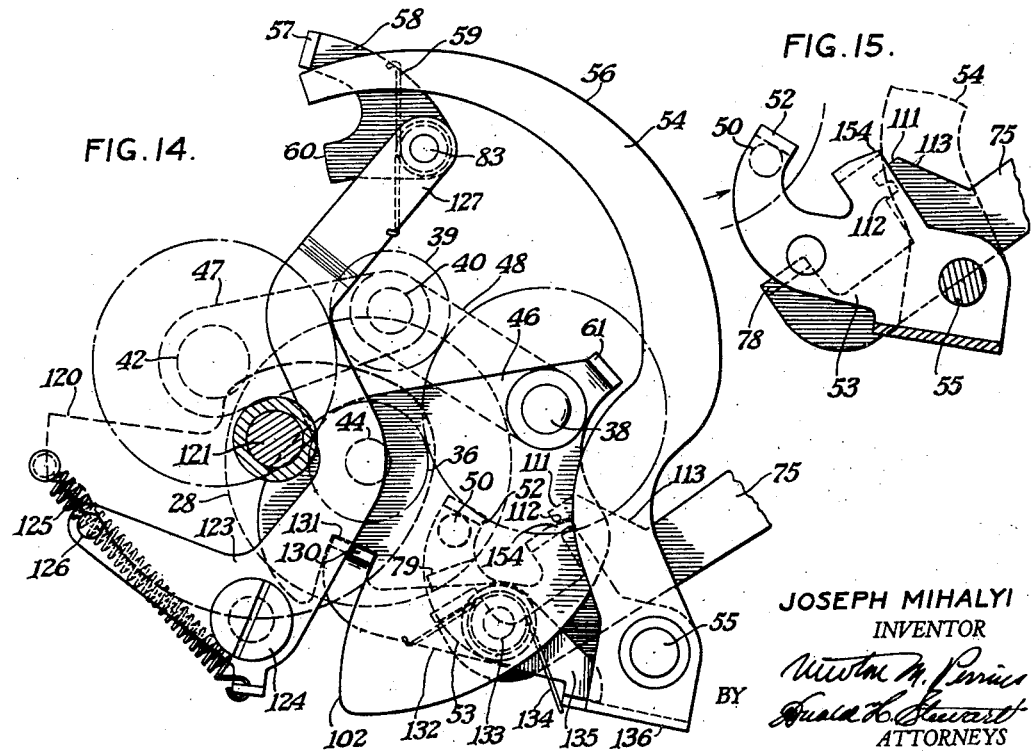
FIG. 12.
FIG. 14.
FIG. 15.
JOSEPH MIHALYI
INVENTOR
BY
ATTORNEYS June 7, 1949.    J. MIHALYI    2,472,607
VARIABLE APERTURE CURTAIN SHUTTER FOR CAMERAS
Filed July 30, 1946    5 Sheets-Sheet 5
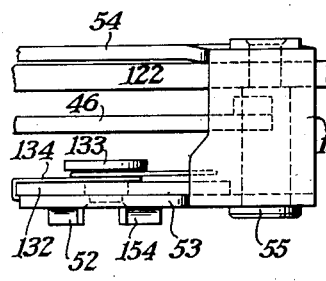
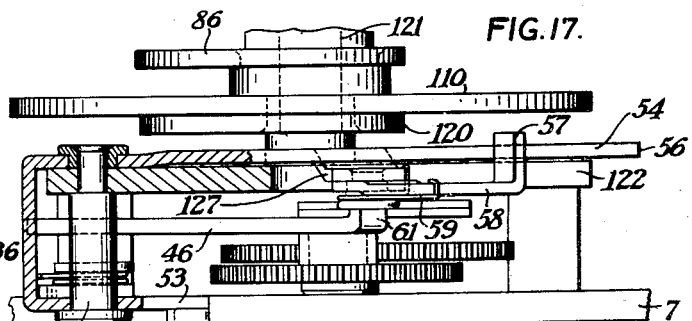
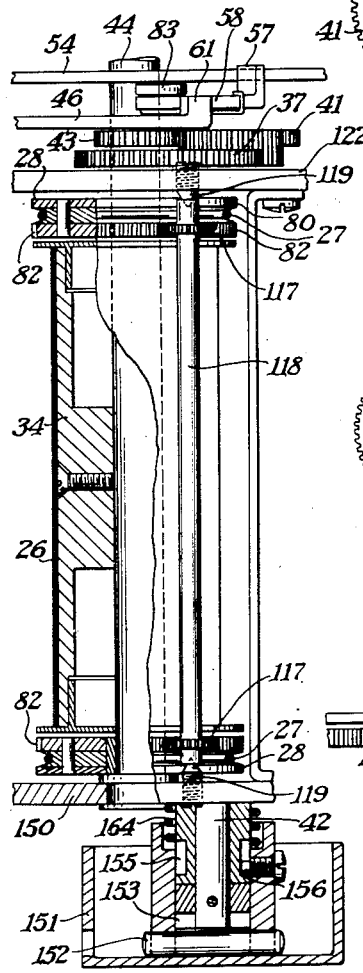
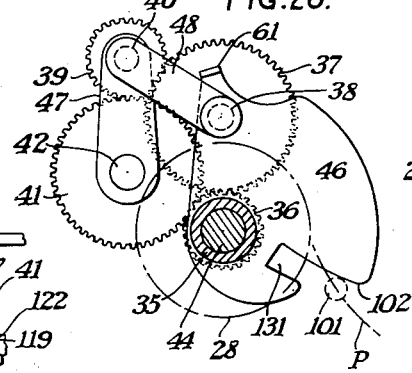
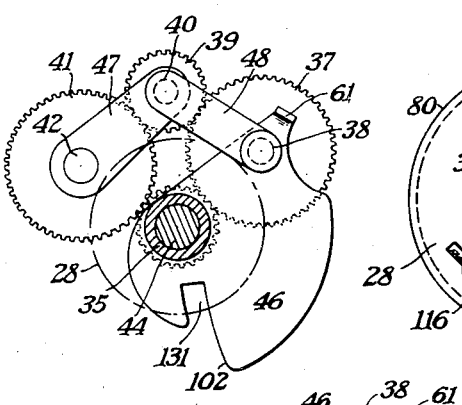
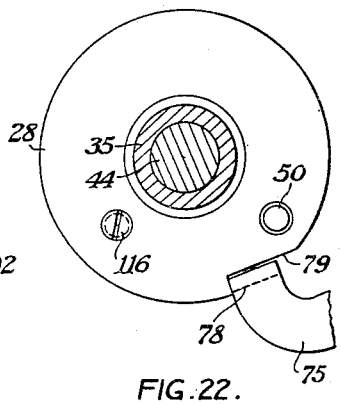
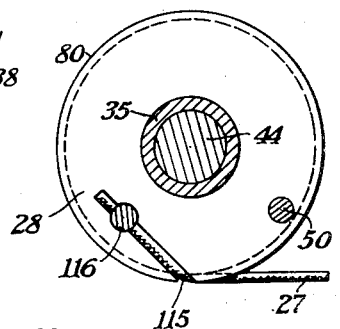
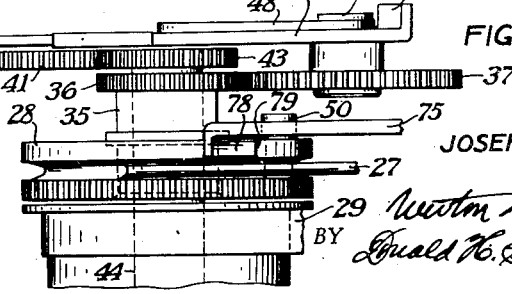
JOSEPH MIHALYI
INVENTOR
BY
ATTORNEYS Patented June 7, 1949

2,472,607

UNITED STATES PATENT OFFICE 2,472,607

VARIABLE APERTURE CURTAIN SHUTTER
FOR CAMERAS

Joseph Mihalyi, Rochester, N. Y., assignor to
Eastman Kodak Company, Rochester, N. Y., a
corporation of New Jersey Application July 30, 1946, Serial No. 687,093

21 Claims. (Cl. 95—57)

This invention relates to photographic shutters and particularly to curtain shutters for cameras. One object of my invention is to provide a curtain shutter in which the two curtains are permanently intergeared with planetary gearing so arranged that the two curtains may be moved together, or separately. Another object is to provide a shutter with two curtains which may be moved in one direction with a fixed-width slot between the curtains for making an exposure, to provide an automatic means for closing the slot after exposure for rewinding, or setting, and to provide a means for setting the shutter with the required slot width at any time—that is, either before or after the shutter is set for exposure. Still another object is to provide a single shutter control with units of speed graduated into even spacing, or at any desired spacing, to facilitate setting the shutter. Other objects will appear from the following specification, the novel features being particularly pointed out at the end thereof.

Curtain shutters have been almost universally constructed to move one curtain relative to the other through the operation of a clutch, or a slip clutch. Both of these devices usually suffer from the difficulty that the clutch cannot always be made to operate at the exact required position, or at the desired degree of slip. The aperture between the curtains forming an exposure slot must be accurately held as to width, particularly during exposure. Moreover, almost all such shutters must be set while the curtains are in one specific location as, for instance, when set for an exposure. Some shutters release separate curtains, one after the other, but with such constructions the exact width of the exposure slot depends almost entirely on properly balancing the separate curtain shutter springs—an expensive and difficult operation.

I have overcome many of these difficulties by intergearing two curtains with gears so the relation of the curtains may be rigorously maintained, and by making certain gears planetary gears, the two curtains may be moved relative to each other without clutching and unclutching, and without the use of a slip clutch. I am aware that an attempt has been made to use planetary gearing in curtain shutters, but the adjusting means is not shown, or described, nor is the showing such that this necessary adjustment can be made through a single adjusting gear, as shown.

I have utilized planetary gearing for controlling my two shutter curtains, and have provided a mechanism for controlling the positions of these gears which not only ties the two curtains together for movement and adjustment, but which also, through the elimination of clutches and slip clutches, enables an operator to positively control and adjust the curtains in any rest positions.

Coming now to the drawings in which like reference characters designate like parts throughout:

Fig. 11 is a fragmentary detail section on line 11—11 of Fig. 12;

Fig. 12 is a top plan view partially in section of a portion of the shutter-controlling mechanism as it would appear in a wound-up position when the shutter is set for a high speed;

Fig. 13 is a fragmentary detail section through a portion of the shutter-tripping and planetary-control mechanism;

Fig. 14 is a view similar to Fig. 12 but with the parts in the position they assume when the shutter is released for a slow-speed exposure;

Fig. 15 is a detail part elevation and part section of a release lever detent set for bulb exposure;

Fig. 16 is a fragmentary side elevation showing the relationship of a sickle-shaped lever and related shutter parts;

Fig. 17 is a fragmentary detail part section on line 17—17 of Fig. 12 showing the relationship of the speed cam, the retarded exposure cam, and the retard cam and associated mechanism;

Fig. 18 is a transverse section through a portion of the film-winding and shutter-setting mechanism;

Fig. 19 is a fragmentary detail showing a shutter latch mechanism forming a part of a coaxially-positioned shutter roller support;

Fig. 20 is a plan view partially in section of gearing including planetary gears connecting the two curtains, the gearing being shown in a shutter-wound position;

Fig. 21 is a view similar to Fig. 20 but with the gearing and planetary gears shown in the position the parts assume when there is a slot between the shutter members;

Fig. 22 is a fragmentary detail showing one of the pulleys and cords for connecting the first curtain to the rewinding spindle; and Fig. 23 is a side elevation of a portion of the gearing including planetary gears and the rewinding spindle and associated mechanism.

My invention consists broadly in providing two curtains which are always geared together, the gearing including planetary gearing which permits relative movement between one curtain and the other as for opening up a curtain slot or closing down a curtain slot when certain gears are permitted to move about other gears; this gearing also serving to hold the two curtains together when the gear centers are held in a relatively-fixed position. I also plan to connect up the film-winding mechanism with the curtain-shutter mechanism to prevent double exposures.

Figure 1:
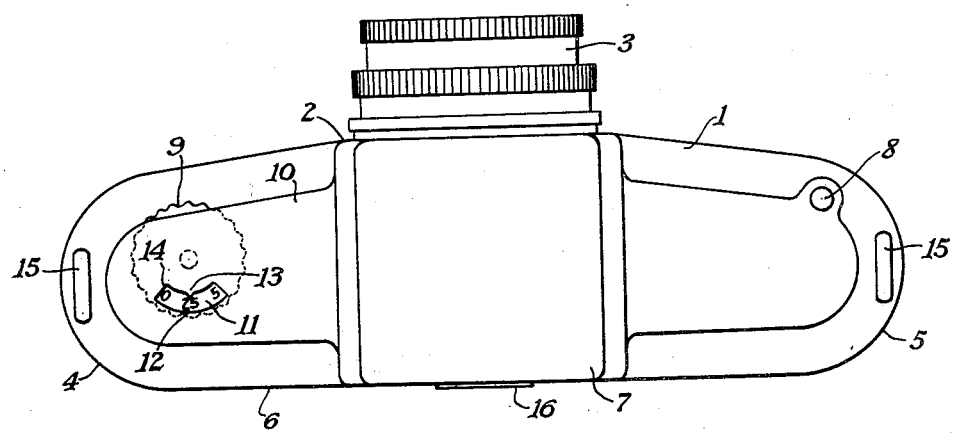
Fig. 1 is a top plan view of a camera including a focal plane shutter constructed in accordance with and embodying a preferred form of my invention.
Figure 2:
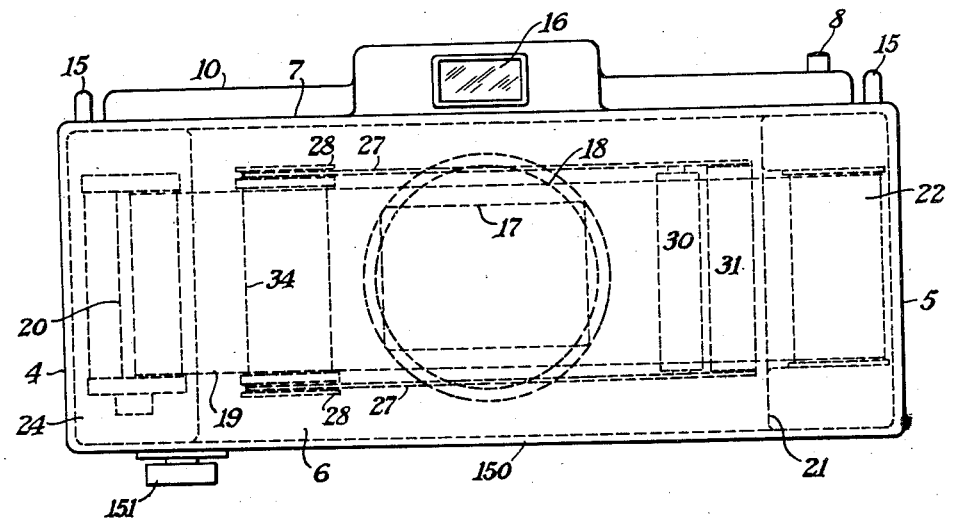
Fig. 2 is a rear view of the camera shown in Fig. 1 with certain parts being outlined in broken lines to show the relative position of the film and focal plane shutter.
Figure 3:
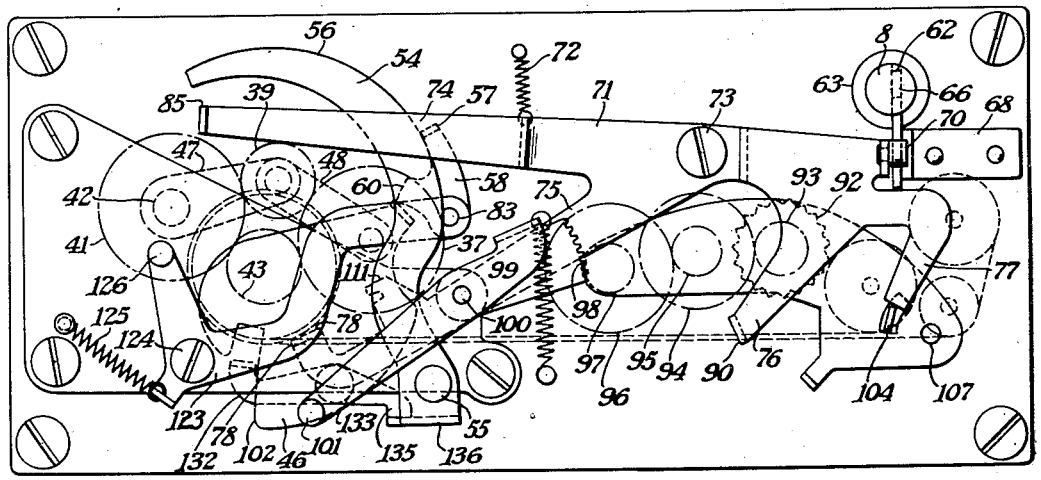
Fig. 3 is a top plan view of shutter mechanism removed from the camera, certain parts being omitted for the sake of clearness.

Referring to Figs. 1 and 2 wherein a typical camera, which may include my improved type of focal plane shutter, is shown, Fig. 1 indicates a camera having a body portion 1 on the front 2 of which an objective 3 preferably in a focusing mount of known type may be mounted. The camera includes rounded end walls 4 and 5, a rear wall 6, and a top wall 7. A trigger 8 operating a shutter-release lever passes upwardly through the top wall 7 on one side of the camera and a shutter-setting knob 9 projects from under a part of casing 10 on the opposite side of the top wall 7. A speed dial 11 carries graduations 12 which may be brought opposite to a pointer 13 in the window 14 to indicate the speed setting of the shutter. Known types of brackets 15 are provided for a carrying strap. The top wall 7 may be provided with the usual type of finder 16. Inside of the rear wall 6 of the camera there is the usual exposure frame 17 axially aligned with the lens cell 18 of the objective, over which a film 19 may be reeled for exposure. A supply of film may be carried by a spool 20 and there may be a take-up spool in a chamber 21 although I prefer to provide a loose coil 22 of the film in the chamber 21 by loading a supply spool 20 in the supply chamber 24 and reeling all the film into the chamber 21 in a loose coil, after which the film is drawn backwardly again onto the supply spool 20, one exposure at a time. Such types of cameras are known and this forms no part of my present invention.

Figure 8:
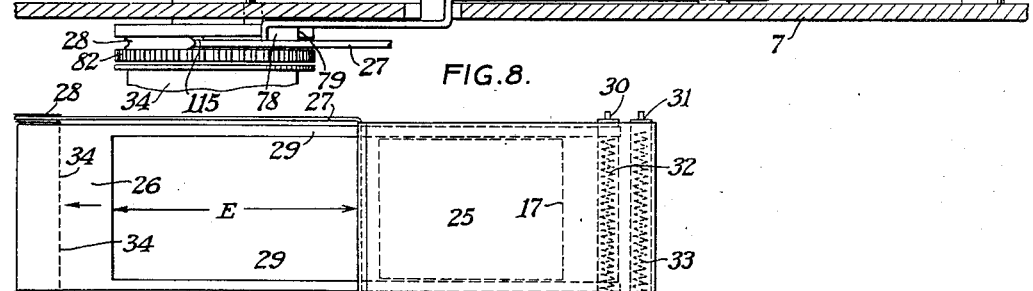
Fig. 8 is a rear elevation showing somewhat diagrammatically the two curtains in the position they would assume when the shutters are rewound and adjusted for a relatively slow exposure, such as 1/25 of a second.
Figure 9:
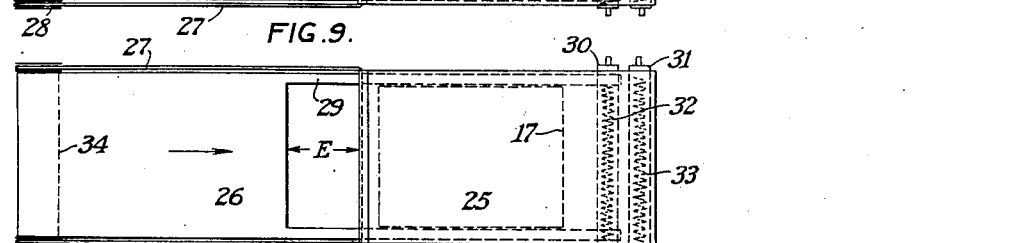
Fig. 9 is a view similar to Fig. 8 but with the shutter slot considerably smaller than in Fig. 8 for a faster exposure, such as 1/100 of a second.
Figure 10:
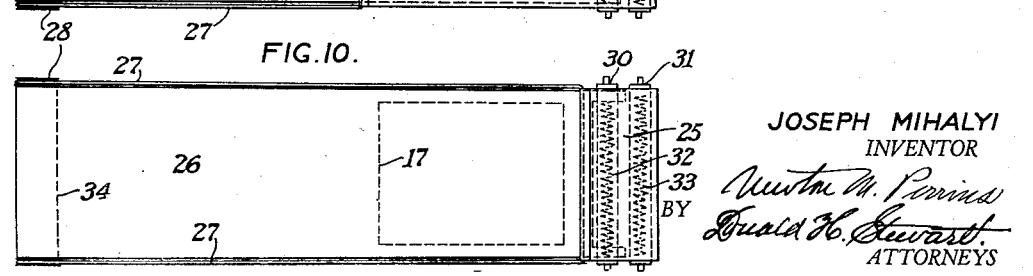
Fig. 10 is a view similar to the preceding figures, but with the shutter shown in a run-down condition after an exposure has been made.

Referring to Figs. 8, 9, and 10, my present shutter is like many curtain shutters in that it includes two curtains which may be designated as a "first curtain" 25, since this curtain is the first curtain to move across the exposure aperture 17, and a "second curtain" 26, since this curtain is the second curtain to move across the exposure aperture 17 in making an exposure. The curtain 25 may be attached by means of tapes, or cords, 27 to pulleys 28 and the second curtain 26 may be attached as by tapes, or cords, 29 to a spring-driven take-up roller 30. Curtain 25 is directly attached to a spring-driven, take-up roller 31; the springs 32 of roller 30 and the springs 33 of roller 31 always tending to wind their respective curtains thereon. As thus far described, the construction is known.

The curtain 26 and its tapes 29 may be wound upon the drum 34 when the shutter is set, this drum lying coaxially with the pulleys 28. The curtain 25, when wound, is at least partially wound on the pulleys 28. In referring to these two curtains in the specification and claims, I refer to the curtains themselves and to their tapes and/or cords which form parts of the curtain. Thus, curtain 26 includes the tapes 29 and curtain 25 includes the cords 27.

As briefly pointed out above, I gear the two curtains 25 and 26 together by gearing, including planetary gears, which permits the two curtains to move as a single unit when the centers of the planetary gears are held stationary. When the centers of the planetary gears are permitted to move, one curtain may move relative to the other for opening up an exposure slot E between the curtains, or may move for closing the slot E so that the curtains will lie in overlapping relationship, permitting the shutter to be set without permitting light to pass through the exposure aperture 17.

Figure 4:
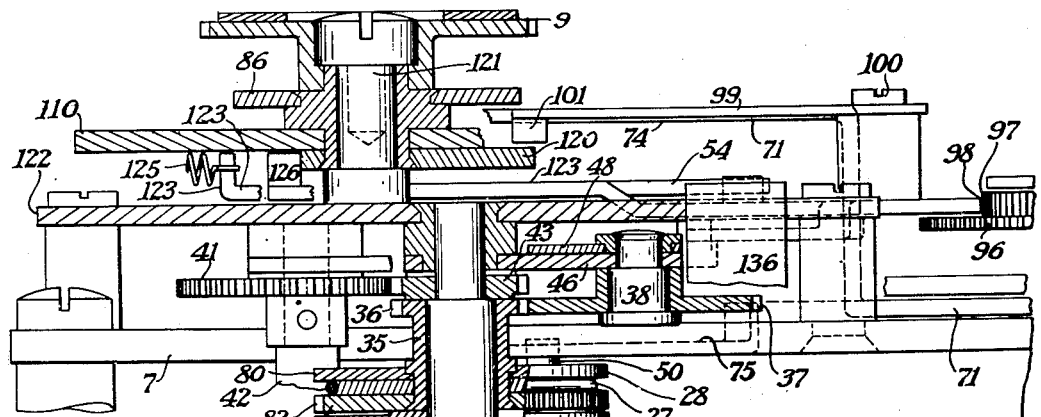
Fig. 4 is a fragmentary part-section, part-side elevation showing a portion of the mechanism shown in Fig. 3.

This gearing, best shown in Figs. 7, 20, 21, and 23, is arranged as follows: A sleeve shaft 35, Fig. 23, carries gear 36, this gear meshing with planetary gear 37 carried on the stud 38. Gear 37 meshes with a planetary gear 39 carried by a stud 40. Gear 39 meshes with a gear 41 carried by the fixed-axis shaft 42. Gear 41 meshes with a gear 43 carried by a shaft 44 which, as best shown in Fig. 4, is connected through the drum 34 to turn this drum. On the other hand, gear 36 is connected to the sleeve shaft 35 which, in turn, is connected to pulley 28 carrying the cords 27, forming a part of the shutter 25.

The axis of shaft 44 is fixed and the axis of shaft 42 is also fixed so that while the gear 41 may turn about the shaft 42, it does not change its position relative to gear 43 connected to the drum 34, Figs. 23 and 4. However, the gears 36 and 43 may move differentially through movement of the planetary gears 37 and 39. Since the former gear is connected to the pulleys 28 and since the latter gear is connected to the drum the curtains 25 and 26 may be adjusted relative to each other to vary the slot E.

Gear 37 is mounted on the stud 38 and this stud, together with the stud 40, is movably mounted on what may be considered as parallel links 46 and 47 connected by a link 48. Thus, the centers of the studs 40 and 38 may swing between the positions indicated in Fig. 20 and Fig. 21 and when this occurs, the pulleys 28 and the drum 34 will be differentially moved, thereby changing the relative position of the curtains 25 and 26. It is, therefore, necessary to prevent the studs 38 and 40 from changing position except when it is desirable to change the relative position of the curtains 25 and 26. Relative movement is required when the shutter is being set for an exposure to determine the width of the slot E, and, at the completion of an exposure when it is desirable to entirely close the slot E so that the shutter can be rewound or set. At other times, in making an exposure and in rewinding, fixed relation of shutter curtains 25 and 26 is required.

To control the movement of the planetary gears, the mechanism best shown in Figs. 12 and 14 is employed. A pin 50, Figs. 12 and 14, extends upwardly from the pulley 28 and this pin makes approximately one revolution for the complete travel of the shutter across the exposure aperture and for rewinding. This pin 50, during the rewinding movement, turns in a clockwise direction, moving from the Fig. 14 to the Fig. 12 position. As it moves toward the end of its movement, this pin strikes a lug 52 on the end of a short arm 53 of a sickle-shaped lever 54, this lever being pivoted upon a stud 55 to turn between its Fig. 12 and Fig. 14 positions. When in its Fig. 12 position, the cam surface 56 of the sickle permits the lug 57 to position a latch 58 pressed by a spring 59 towards the cam 56. This positions a stop 60 in the path of a lug 61, this lug being formed on one end of the plate 46 which forms one of the parallel links carrying the planetary gears. The position of the stop 60 therefore controls the position of the parallel links and, consequently, the relative position of the two curtains. Fig. 12 shows the relative position of the planetary gears when the shutter is set for a high speed. Fig. 14 illustrates the position when the shutter is set for a slow speed.

Figure 5:
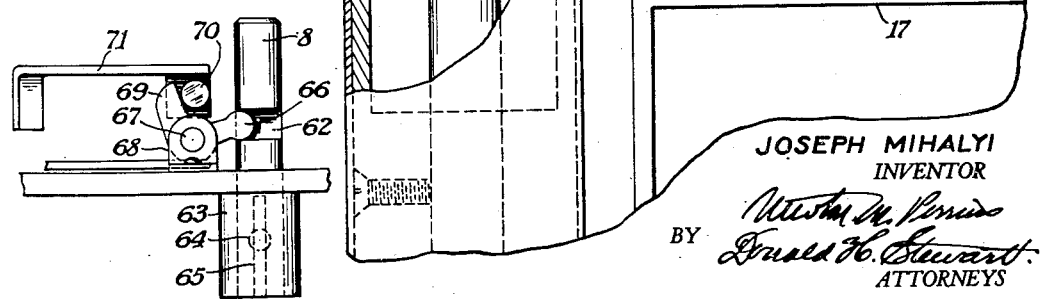
Fig. 5 is a fragmentary detail showing a side elevation of the shutter-releasing lever and trigger.

The trigger 8 is, as best shown in Fig. 5, notched at 62 and mounted to slide vertically in bushing 63, a pin 64 and slot 65 preventing turning. One end 66 of a bell crank lever pivoted at 67 to a bracket 68 engages notch 62 and the other end 69 is adapted to press on pin 70 of release lever 71. A spring 72, Fig. 6, holds the pin 70 against bell crank arm 69. Release lever 71 is pivoted on a stud 73 and has a series of arms 74, 75, 76, and 77.

The end 78 of arm 75, is positioned to engage a notch 79, Figs. 12 and 13, in the upper flange 80, Fig. 18, of the pulley 28, and the lower flange 81 thereof includes gear teeth 82. This holds the curtains against movement, but pressure on trigger 8 moves lever 71 in the direction shown by the arrow in Fig. 6 swinging the end 78 of arm 75 out of notch 79 in pulley 28, Figs. 12 and 19, permitting the spring rollers 32 and 33 to move the curtains together, so the slot E passes the exposure aperture 17 to make an exposure.

The pin 50 meanwhile swings counter-clockwise, until, as shown in Fig. 14, strikes the opposite side of flange 52, as shown in Fig. 14, thereby moving sickle 54 to the position shown therein, swinging latch 58 about its pivot 83 and against the pressure of its spring 59 so that the stop 60 no longer prevents movement of the planetary gears 37—39, which may therefore move. The spring rollers 32—33 can therefore move the second curtain 26 into overlapping relationship with the first curtain 25 and the shutter may then be set.

Arm 74 of lever 71 controls the extent of movement of the arm about pivot 73. The turned-up end 85, Fig. 6, may lie against a series of surfaces on the cam 86, which surfaces are 87 for "bulb" exposures, 88 for slow automatic exposures, and 89 for high-speed exposures.

When the trigger 8 is pressed, lever 71 swings counter-clockwise about its pivot 73. When controlled by cam surface 87 for "bulb," the lever 71 swings a maximum distance and the arms 76 and 77 are operatively positioned as follows: Arm 76, through its downwardly-formed lug 90, Fig. 6, pulls one end of retard pallet 91 against the starwheel 92 of gear train consisting of a plurality of gears 93, 94, 95, 96, and 97; the latter meshing with gear segment 98, thereby locking the train until trigger 8 is released. Thus, releasing trigger 8 permits lever 71 to return under its spring 72 to its initial position. Curtains 25 and 26 travel together onto their respective spring rollers 32 and 33 with a slot E between them making the exposure. After the pulley 81 has made one revolution and pin 50 engages flange 52 of sickle 54, the sickle is turned clockwise about its pivot 55. Sickle 54 carries latch 58 outwardly so that stop 60 is slipped off lug 61 of parallel link 46, permitting the planetary gears to move. Shaft 44, Fig. 4, is then free to move and curtain 26 may follow curtain 25, closing the exposure aperture 17.

Figure 6:
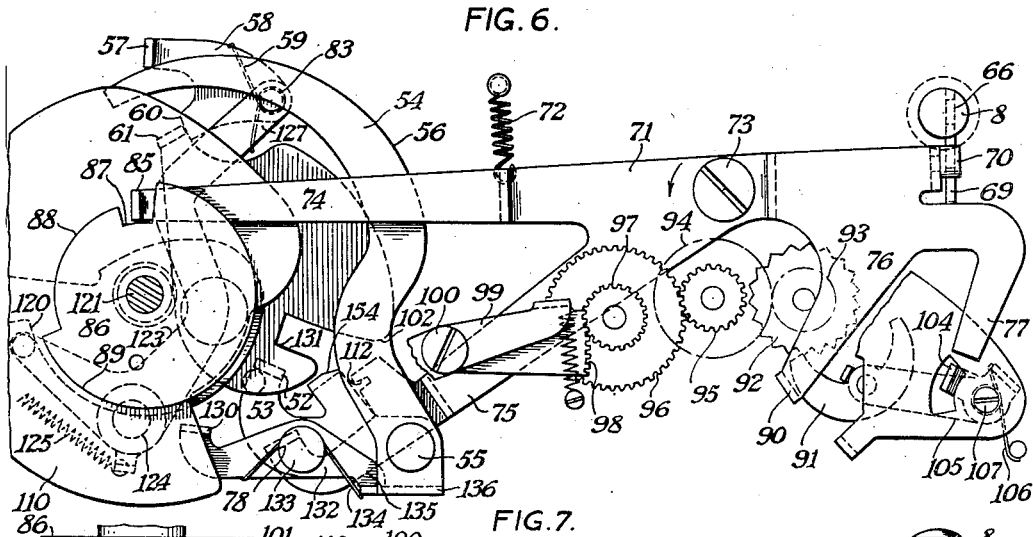
Fig. 6 is a top plan view of portions of the shutter-mechanism control, certain parts being omitted and the parts shown being in position for a slow or "bulb" exposure.
Figure 7:
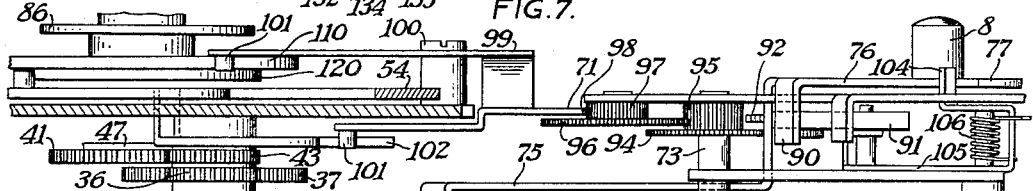
Fig. 7 is a transverse section through the mechanism shown in Fig. 6 with certain parts omitted.

When the end 85 of arm 74 is restricted by surface 88 of cam 86, Fig. 6, the shutter is retarded for slow, automatic exposures. The pallet 91 is permitted to engage the starwheel 92 and the gear train retards the movement of the arm 99 pivoted at 100 through the engagement of end 101, Fig. 7, with the cam 102 carried by, and forming part of, link 46. The end 101 is diagrammatically shown in Fig 20 with the path of movement about its pivot 100 dotted in at P. The parallel link 46 is therefore retarded through end pin 101 and cam 102.

For short, automatic exposures of $\frac{1}{10}$ and $\frac{1}{25}$, for instance, Fig. 6, the movement of the release lever 71 is such that pallet 91 is moved away from starwheel 92 by arm 77 engaging lug 104 of lever 105 pressed by spring 106 in a clockwise direction about pivot 107. Thus, only the gears 93 to 97 retard through end pin 101 and cam 102.

For fast, unretarded exposures as $\frac{1}{50}$ to $\frac{1}{1000}$ of a second, the cam 110 moves arm 99 to an inoperative position in which pin 101 is entirely out of the path of cam 102, forming part of parallel link 46. The exposure is then solely determined by the width of the slot E between the curtains and the power of springs 32 and 33.

It might be possible for an operator to accidentally, or purposely, depress the release 8 and immediately release it before a complete cycle of operation can take place. This type of releasing would not make much difference for any except slow, automatic exposures, such as exposures of $\frac{1}{10}$ of a second, and slower. However, I have prevented such improper operation. The sickle 54, as best shown in Figs. 12, 14, and 15, is provided with a hook 154 which is carried by arm 53 and is spaced from lug 52. This hook may engage, or lie over, the top 111 of arm 113, which is an extension of release lever 71, arm 75, or in a notch 112 in arm 113, according to the position of the lever 71. This hook 154 moves clockwise when lug 52 is struck by pin 50 moving through its counter-clockwise path, thus moving the sickle 54 and hook 154 to an operative position. If lever 71 is in position for lug 85 to engage cam surface 89, the hook 154 may engage notch 112. If the lug 85 is in engagement with cam surfaces 87 or 88, then hook 154 will pass over the top of the end 111 of the arm, so that in both cases the trip lever is unable to immediately return under the impulse of spring 72 to its normal position of rest. Thus, the release lever will function properly under all circumstances regardless of how fast the trigger 8 may be depressed and released.

As indicated in Fig. 22, the cords and/or cables 27 forming a part of the first curtain 25 can pass through a notch 115 in the pulley 28 and may be securely fastened to a stud 116 carried thereby. Referring to Fig. 18 it will be noted that each pulley 28 (upper and lower) is provided with gears, the teeth 82 of which each mesh with similar pinions 117, carried by shaft 118 which turns on bearings 119 so that both pulleys 28 turn together at all times. The upper pulley 28 is keyed to the sleeve shaft 35 carrying gear 36 which is a fixed center gear about which planetary gear 37 may move circumferentially.

The retard cam 110, the part retard and "bulb" cam 89, and a speed-adjusting cam 120 are all carried on a shaft 121 and all turn with this shaft. Shaft 121 is carried by the shutter mechanism plate 122 and may, of course, be turned by the knurled ring 9 which brings the shutter speed graduations 25 beneath the window pointer 13 to indicate the shutter speed setting.

A bell crank lever 123, Figs. 12–13, is pivoted at 124 to mechanism plate 122 and a spring 125 tends to turn the lever counter-clockwise. This tendency holds lever end 126 against the speed-adjusting cam 120, and the other end 127 of the bell crank lever 123 carries the stud 83 pivotally supporting latch 58 which spring 59 holds against cam 56 of the sickle lever. The position of bell crank 58 positions stop 60 and consequently controls the shutter speed by controlling possible movement of the planetary gearing.

Shaft 42 has been described as having a fixed axis, that is, the shaft cannot swing when planetary gears 37 and 39 swing about the gears 36 and 41. Therefore, shaft 42 can be used for setting the shutter. This shaft is, Fig. 18, brought down through the bottom camera wall 150 and is connected to a winding knob 151 through a clutch bar 152 entering clutch groove 153 when the knob 151 is moved against the pressure of a spring 164 being guided by slot 155 and pin 156. Thus, the knob does not normally turn with shaft 42 and gear 41, but may turn the shaft 42 when the knob is forced toward the camera body. After an exposure knob 151 may be turned to turn gear 41 and with it the planetary gearing, this gearing first winding the curtains in closed condition past the exposure aperture 17 and after so winding, the planetary gears may move to open an exposure slot and until parallel link 46 abutment 61 comes to rest upon stop 60 at its previous setting. This setting—the position of lever 58—can be adjusted either before or after setting through the speed-setting cam 120 and lever 123.

The parallel link 46 is formed of a plate having a cam 102, as above explained, and it also includes a notch 131 for the reception of a spring latch arm 130. This arm is carried by a lever 132 mounted on the pivot 133 carried by arm 53 of the sickle lever 54. A spring 134 normally turns lever arm 135 into contact with a turned-up section 136 of the sickle lever 54, so that the end 130 of this lever may run on the cam 102 of the parallel link 46 and snap into the notch 131 without disturbing sickle-arm 54. The reason for this is that the spring latch 130 may snap into notch 131 at the end of the gear train movement as the gear train must return to its position of rest after a retarded exposure. The latch 130 is, of course, moved out of the notch 131 when the pin 50, turning clockwise, Fig. 12, strikes lug 52 and moves the sickle lever 54 about its pivot 55. Thus, Fig. 12 shows the parts ready to make an exposure of, say 1/1000 of a second with the shutter wound.

Since shaft 42 turns a fixed distance for setting the shutter, I prefer to also use this shaft as a control for winding film, thus preventing double exposure, but since this forms no part of my present invention, it is not being further shown or described.

The construction of my shutter is such that the curtains 25 and 26 are always geared together whether moving in unison for exposure and rewinding, or moving to vary or close the slot E for adjusting for an exposure or closing the slot completely for rewinding. No clutches, or slip clutches, between the curtains are employed. Their relationship is always definite and predetermined. The operation from the standpoint of an operator is extremely simple and yet, results are exact. To make an exposure, the operator turns knurled disc 9 until the speed dial 11 indicates the speed—1/25 of a second in Fig. 1. Film and the shutter are simultaneously positioned for exposure when knob 151 is clutched to shaft 42 and turned.

This turns gear 41 and the first curtain gear 36 through planetary gears 37 and 39, and also turns the second curtain gear 43, thereby winding both curtains in overlapping relation past the exposure aperture 17 to a fully-wound position. This causes pin 50, carried by the upper pulley 28, to travel in a clockwise direction, striking lug 52 of sickle lever 54, driving it to its Fig. 12 position about its pivot 55.

During the winding movement, the spring latch 130, Fig. 14, is in engagement with the notch 131 of cam 102 formed on one of the parallel links 46 preventing movement of the planetary gears during rewinding. The sickle lever 54 is in the Fig. 14 position. Pin 50, moving clockwise, strikes lug 52 on the sickle lever 54, thus moving lug 130 out of the notch 131 in cam link 46. Spool flanges 28 are held against movement when release lever lug 78 engages notch 79 of pulley 28 and winding is limited by the pin 50, striking lugs 52. When the first curtain 25 stops, as above described, the second curtain 26 can be still further wound and the planetary gearing moves to open the slot E to its full width. The location of the speed-control dial does not, at this point, affect winding, as lug 61 snaps past stop 60, as latch 58 permits this movement because of spring 59, returning immediately to a position in which lug 57 rests on cam 56 of sickle lever 54.

However, when the operator releases knob 121, the tension on the second curtain 26, due to spring roller 30, moves shaft counter-clockwise until lug 61 strikes stop 60 which has been previously set for the desired speed. Thus, the required width of slot is automatically formed in rewinding, and it is only necessary to press trigger 8 to release the shutter.

When trigger 8 is depressed, the bell crank lever, pivoted at 67, moves release lever 71 counter-clockwise about its pivot 73 against the pressure of spring 72. The extent of this movement varies with the position of the cam 86 as the projection 85 may rest on any of the following cam surfaces, 87, 88, or 89. 87 is for bulb; 88 for slow automatic speeds, and 89 is a sloping curve for high speeds. In any of these positions, the release 78 may be disengaged from pulley 28 and notch 79 to release the shutter, when trigger 8 is depressed. The parallel link 46 being held against movement by lug 61 and abutment 60, an exposure is made with the curtains moving exactly together because of the gearing.

With the shutter construction described above, the relationship of the curtains is always exactly maintained. Being geared together by gears, including planetary gears 37 and 39, movement of the centers of these gears permits relative adjustment of the curtains for opening the slot E and closing the slot for rewinding. At any given position of the planetary gears, the shutters bear a predetermined relationship. It is, therefore, a simple matter to maintain the slot E at the exact setting required. Clutches and slip clutches, which usually result in inexact structures, are entirely omitted.

I claim:

1. A controlling device for curtain shutters of the type having two curtains normally covering an exposure aperture, two spring rollers, one attached to each curtain for supporting one end of each curtain to one side of the exposure aperture, and coaxially arranged rollers, one supporting each curtain on the opposite side of the exposure aperture, the combination with said curtains and their supporting rollers, of controlling mechanism comprising gearing interconnecting the coaxially arranged rollers, and including a gear attached to each of the two of the coaxially-supported rollers, one for each curtain, gearing connecting said two gears including at least two movably-mounted intermeshing gears, means for shifting the axes of the movably-mounted gears while maintaining all gears in mesh, said controlling mechanism also including means for moving the shiftable axes of the movably-mounted gears to predetermined positions to adjust the width of an exposure slot between the curtains.

2. A setting device for curtain shutters, as defined in claim 1, characterized by the movably-mounted gears being carried by a movable parallel link support for shifting the axes of said movably mounted gears, an end of each parallel link being pivotally attached to a movable link whereby two gears of the gearing may move relative to the gears attached to the coaxially-mounted rollers carrying one end of each curtain.

3. A setting device for curtain shutters, as defined in claim 1, characterized by the movably-mounted gears being carried by a movable parallel link support for shifting the axes of the movably mounted gears, one of said parallel links including a cam, and a retard mechanism cooperating with said cam to determine the speed of movement of the parallel links.

4. A setting device for curtain shutters, as defined in claim 1, characterized by the movably-mounted gears being carried by a movable parallel link support, adapted to shift the centers of the movably-mounted gears, and mechanism for controlling the position of the parallel links and thereby governing the width of an exposure slot between the curtains.

5. A controlling device for curtain shutters of the type having two curtains normally covering an exposure aperture, two spring rollers, one attached to each curtain for supporting one end of each curtain to one side of the exposure aperture, and coaxially-arranged rollers, one supporting each curtain on the opposite side of the exposure aperture, the combination with said curtains and their supporting rollers, of controlling mechanism comprising gearing interconnecting the coaxially arranged rollers, and including a gear attached to two of the coaxially-supported rollers, one for each curtain, one gear being mounted on a fixed stud, a movable parallel link support carrying the movably-mounted gears whereby the latter may swing about and remain in mesh with the gears having fixed centers for turning one gear attached to a coaxially-supported roller for one curtain relative to the other gear attached to another coaxially-supported roller for the other curtain whereby one curtain may be moved relative to the other curtain, and a manually-adjustable mechanism to control the movement of the parallel link support.

6. A controlling device for curtain shutters of the type having two curtains normally covering an exposure aperture, two spring rollers, one attached to each curtain for supporting each curtain to one side of the exposure aperture, and coaxially-arranged rollers, one supporting each curtain on the opposite side of the exposure aperture, the combination with said curtains and their supporting rollers, of controlling mechanism comprising gearing interconnecting the coaxially arranged rollers, and including a gear attached to two of the coaxially-supported rollers, one for each curtain, one gear being mounted on a fixed stud, a movable parallel link support carrying the movably-mounted gears whereby the latter may swing about and remain in mesh with the gears having fixed centers for turning one gear attached to a coaxially-supported roller for one curtain relative to the other gear attached to another coaxially-supported roller for the other curtain whereby one curtain may be moved relative to the other curtain, a manually-adjustable mechanism to control the movement of the parallel link support, a gear retard having a movable gear-retarded arm, a cam on one of the parallel links and means for varying contact of the gear-retarded arm and the cam to control the speed of movement of the parallel link support.

7. The shutter-setting device, defined in claim 1, characterized by a detent in a coaxially-arranged roll for one curtain, and a release lever normally engaging said detent.

8. A controlling device for curtain shutters of the type having two curtains normally covering an exposure aperture, two spring rollers, one attached to each curtain for supporting each curtain to one side of the exposure aperture, and coaxially-arranged rollers, one supporting each curtain on the opposite side of the exposure aperture, the combination with said curtains and their supporting rollers, of controlling mechanism comprising gearing interconnecting the coaxially arranged rollers, and including a gear attached to each of the two coaxially-supported rollers, one for each curtain, a gear having a fixed center of rotating meshing with one gear attached to one coaxially-suported roller, two planetary gears, one meshing with the gear having the fixed center and the other meshing with a gear attached to the other coaxially-mounted roller, movable parallel links for holding the planetary gears in mesh, a stop against which the parallel links may rest to maintain the parallel links and planetary gears in a predetermined position for maintaining a predetermined curtain slot between the two curtains, a shutter release, a latch on a coaxial curtain roller, the shutter release releasing the latch whereby the curtains may be wound on their respective spring rollers to make an exposure, and mechanism for releasing the stop against which the parallel links rest to permit movement of the parallel links whereby the planetary gears may move, the spring rollers moving the curtains into overlapping relationship as the planetary gears move.

9. A controlling device for curtain shutters of the type defined in claim 8, characterized by a mechanism for swinging the stop against which the parallel links may rest to various positions, and a manual setting mechanism for swinging the stop.

10. A controlling device for curtain shutters of the type defined in claim 8, characterized by a mechanism for swinging the stop against which the parallel links may rest to various positions, and a manual setting mechanism for swinging the stop and comprising a sickle-shaped lever.

11. A controlling device for curtain shutters of the type defined in claim 8, characterized by a mechanism for swinging the stop against which the parallel links may rest to various positions, and a manual setting mechanism for swinging the stop and comprising a sickle-shaped lever, and a pin carried by one of the coaxially-mounted rollers for engaging and moving the sickle-shaped lever after an exposure-making movement of the coaxially-mounted rollers.

12. A controlling device for curtain shutters of the type defined in claim 8, characterized by a mechanism for swinging the stop against which the parallel links may rest to various positions, and a manual setting mechanism for swinging the stop and comprising a sickle-shaped lever, and a pin carried by one of the coaxially-mounted rollers for engaging and moving the sickle-shaped lever after an exposure-making movement of the coaxially-mounted rollers, said pin also moving the sickle-shaped lever to an operative position when moved in an opposite direction for setting the shutter.

13. In a focal plane shutter of the type employing two curtains and their tapes, two spring rollers, one attached to one end of each curtain and coaxial rollers, at least one of which supports the opposite end of one curtain, and another of which supports the opposite end of the second curtain, a curtain-controlling device comprising a plurality of intermeshing gears interconnecting the coaxially arranged rollers and including planetary gears, one of said gears being attached to a coaxial roller supporting one curtain, another gear being attached to a coaxial roller supporting the other curtain, planetary gearing connecting the gears attached to the curtain rollers whereby said curtains may be made to move together, means for holding the axes of the gears in fixed relation and means for shifting the axial location of the planetary gears relative to the gears attached to said rollers whereby one curtain may be moved relative to another, a shutter latch, means for releasing the latch whereby the spring rollers may move the curtains to make an exposure while holding the planetary gears against movement and means for releasing the holding means at the end of an exposure whereby said planetary rollers may shift their axial relationship to the rollers attached to one end of the curtains whereby one curtain may move relative to the other to close the exposure slot therebetween.

14. In a focal plane shutter of the type employing two curtains and their tapes, two spring rollers, one attached to one end of each curtain and coaxial rollers, at least one of which supports the opposite end of one curtain, and another of which supports the opposite end of the second curtain, a curtain-controlling device comprising a plurality of intermeshing gears interconnecting the coaxially arranged rollers and including planetary gears, one of said gears being attached to a coaxial roller supporting one curtain, another gear being attached to a coaxial roller supporting the other curtain, planetary gearing connecting the gears attached to the curtain rollers whereby said curtains may be made to move together, means for holding the gears in fixed relation and means for shifting the axial location of the planetary gears relative to the gears attached to said rollers whereby one curtain may be moved relative to another, a shutter latch, means for releasing the latch whereby the spring rollers may move the curtains to make an exposure, means for holding the axes of the planetary gears against movement after the latch is released and means for releasing the holding means at the end of an exposure whereby said planetary gears may shift their axial relationship to the rollers attached to one end of the curtains whereby one curtain may move relative to the other to close the exposure slot therebetween, and means for latching the curtains closed preventing the planetary gears from shifting their axial relationship with the rollers after an exposure is completed, and means for setting the shutter while said curtains are so latched.

15. In a focal plane shutter of the type employing two curtains and their tapes, two spring rollers, one attached to one end of each curtain and coaxial rollers, at least one of which supports the opposite end of one curtain, and another of which supports the opposite end of the second curtain, a curtain-controlling device comprising a plurality of intermeshing gears interconnecting the coaxially arranged rollers and including planetary gears, one of said gears being attached to a coaxial roller supporting one curtain, another gear being attached to a coaxial roller supporting the other curtain, planetary gearing connecting the gears attached to the curtain rollers whereby said curtains may be made to move together, means for holding the gears in fixed relation and means for shifting the axial location of the planetary gears relative to the gears attached to said rollers whereby one curtain may be moved relative to another, a shutter latch, means for releasing the latch whereby the spring rollers may move the curtains to make an exposure, means for holding the axes of planetary gears against movement and means for releasing the holding means at the end of an exposure whereby said planetary gears may shift their axial relationship to the rollers attached to one end of the curtains whereby one curtain may move relative to the other to close the exposure slot therebetween, and means for latching the curtains closed preventing the planetary gears from shifting their axial relationship with the rollers after an exposure is completed, and means for setting the shutter while said curtains are so latched, and a latch release operable at the end of the setting movement to release the planetary gears for axial movement to form an exposure slot.

16. In a focal plane shutter of the type employing two curtains and their tapes, two spring rollers, one attached to one end of each curtain and coaxial rollers, at least one on which supports the opposite end of one curtain, and another of which supports the opposite end of the second curtain, a curtain-controlling device comprising a plurality of intermeshing gears interconnecting the co-axially arranged rollers and including planetary gears, one of said gears being attached to a co-axial roller supporting one curtain, another gear being attached to a coaxial roller supporting the other curtain, planetary gearing connecting the gears attached to the curtain rollers whereby said curtains may be made to move together, means for holding the gears in fixed relation and means for shifting the axial location of the planetary gears relative to the gears attached to said rollers whereby one curtain may be moved relative to another, a shutter latch, means for releasing the latch whereby the spring rollers may move the curtains to make an exposure, means for holding the axes of the planetary gears against movement after the latch is released and means for releasing the holding means at the end of an exposure whereby said planetary gears may shift their axial relationship to the rollers attached to one end of the curtains whereby one curtain may move relative to the other to close the exposure slot therebetween, and means for latching the curtains closed preventing the planetary gears from shifting their axial relationship with the rollers after an exposure is completed, and means for setting the shutter while said curtains are so latched, a speed stop for determining the width of an exposure slot, a latch release operable at the end of the setting movement to release the planetary gear for axial movement of the gears and relative movement of the curtains whereby a spring roller may move one curtain relative to the other to form an exposure slot while said planetary gears shift their axes until stopped by the speed stop.

17. In a focal plane shutter, the combination of a support including an exposure frame, a spring roller, a curtain attached thereto, a take-up roller attached to the other end thereof, a second spring roller, a second curtain attached thereto, a take-up roller coaxial with the first-mentioned take-up roller and attached to the other end of said second curtain, gears for gearing the curtains together by connecting the coaxially arranged rollers and comprising a gear carried by each of the coaxially-arranged, take-up rollers, a winding spindle including a gear, two planetary gears, one meshing with the winding spindle gear and the other with a take-up roller gear, a swingable support for the planetary gears, a latch element carried thereby, a latch for holding the swingable support against movement and the curtains in fixed relation, means for releasing the latch at each end of the curtain movement for opening an exposure slot and for closing the exposure slot, and means for retaining the axes of the planetary gears and the curtains against relative movement as said curtains are wound across the exposure frame by the winding spindle gear, or as the curtains are moved across the exposure frame by their spring rollers in making an exposure.

18. In a focal plane shutter, the combination of a support including an exposure frame, a spring roller, a curtain attached thereto, a take-up roller attached to the other end thereof, a second spring roller, a second curtain attached thereto, a take-up roller coaxial with the first-mentioned take-up roller and attached to the other end of said second curtain, gears for gearing the curtains together including one gear carried by each of the coaxially-arranged, take-up rollers, a winding spindle including a gear, two planetary gears, one meshing with the winding spindle gear and the other with a take-up roller gear, a swingable support for the planetary gears, a latch element carried thereby, a latch for holding the swingable support against movement and the curtains in fixed relation, means for releasing the latch at each end of the curtain movement for opening an exposure slot and for closing the exposure slot, and means for retaining the axes of the planetary gears and the curtains against relative movement as said curtains are wound across the exposure frame by the winding spindle gear, or as the curtains are moved across the exposure frame by their spring rollers in making an exposure, a manually adjustable stop to limit the movement of the planetary gear swingable support in a slot-opening direction, and means for adjusting said stop.

19. In a focal plane shutter, the combination of a support including an exposure frame, a spring roller, a curtain attached thereto, a take-up roller attached to the other end thereof, a second spring roller, a second curtain attached thereto, a take-up roller coaxial with the first-mentioned take-up roller and attached to the other end of said second curtain, gears for gearing the curtains together including one gear carried by each of the coaxially-arranged, take-up rollers, a winding spindle including a gear, two planetary gears, one meshing with the winding spindle gear and the other with a take-up roller gear, a swingable support for the planetary gears, a latch element carried thereby, a latch for holding the swingable support against movement and the curtains in fixed relation, means for releasing the latch at each end of the curtain movement for opening an exposure slot and for closing the exposure slot, and means for retaining the axes of the planetary gears and the curtains against relative movement as said curtains are wound across the exposure frame by the winding spindle gear, or as the curtains are moved across the exposure frame by their spring rollers in making an exposure, a manually adjustable stop to limit the movement of the planetary gear swingable support in a slot-opening direction, and means for adjusting said stop, and a sickle-shaped lever pivotally mounted and movable to control the position of said stop to an operative position.

20. In a focal plane shutter, the combination of a support including an exposure frame, a spring roller, a curtain attached thereto, a take-up roller attached to the other end thereof, a second spring roller, a second curtain attached thereto, a take-up roller coaxial with the first-mentioned take-up roller and attached to the other end of said second curtain, gears for gearing the curtains together including one gear carried by each of the coaxially-arranged, take-up rollers, a winding spindle including a gear, two planetary gears, one meshing with the winding spindle gear and the other with a take-up roller gear, a swingable support for the planetary gears, a latch element carried thereby, latching mechanisms for holding the swingable support against movement and the curtains in fixed relation, means for releasing the latching mechanisms at each end of the curtain movement for opening an exposure slot and for closing the exposure slot, and means for retaining the axes of the planetary gears and the curtains against relative movement as said curtains are wound across the exposure frame by the winding spindle gear, or as the curtains are moved across the exposure frame by their spring rollers in making an exposure, a manually adjustable stop to limit the movement of the planetary gear swingable support in a slot-opening direction, and means for adjusting said stop, and a sickle-shaped lever pivotally mounted against which said manually adjustable stop is spring-pressed, said sickle-shaped lever being movable to control the position of said stop to an operative position, a pin on a coaxially-arranged curtain roller for moving the sickle-shaped lever after an exposure-making movement of the curtains, whereby the spring rollers may move the curtains to close the exposure slot.

21. In a focal plane shutter, the combination of a support including an exposure frame, a spring roller, a curtain attached thereto, a take-up roller attached to the other end thereof, a second spring roller, a second curtain attached thereto, a take-up roller coaxial with the first-mentioned take-up roller and attached to the other end of said second curtain, gears for gearing the curtains together including one gear carried by each of the coaxially-arranged, take-up rollers, a winding spindle including a gear meshing with one coaxial roller gear and two planetary gears, one meshing with the winding spindle gear and the other with a take-up roller gear thereby gearing the two curtains together, a swingable support for the planetary gears, a latch element carried thereby, latching mechanisms for holding the swingable support against movement and the curtains in fixed relation, means for releasing the latching mechanisms at each end of the curtain movement for opening an exposure slot and for closing the exposure slot, and means for retaining the axes of the planetary gears and the curtains against relative movement as said curtains are wound across the exposure frame by the winding spindle gear, or as the curtains are moved across the exposure frame by their spring rollers in making an exposure, a manually adjustable stop to limit the movement of the planetary gear swingable support in a slot-opening direction, and means for adjusting said stop, and a sickle-shaped lever, a spring for moving the stop against the sickle-shaped lever, said sickle-shaped lever being pivotally mounted and movable to control the position of said stop to an operative position, a pin on a coaxially-arranged curtain roller for moving the sickle-shaped lever after an exposure-making movement of the curtains, whereby the spring rollers may move the curtains to close the exposure slot, said pin on the coaxially-arranged roller likewise moving the sickle-shaped lever to an operative position when the shutter is wound, and a manually operable member for turning the winding spindle gear for winding the curtains to a set position for making an exposure.

JOSEPH MIHALYI.

No references cited.